UNITED STATES PATENT OFFICE.

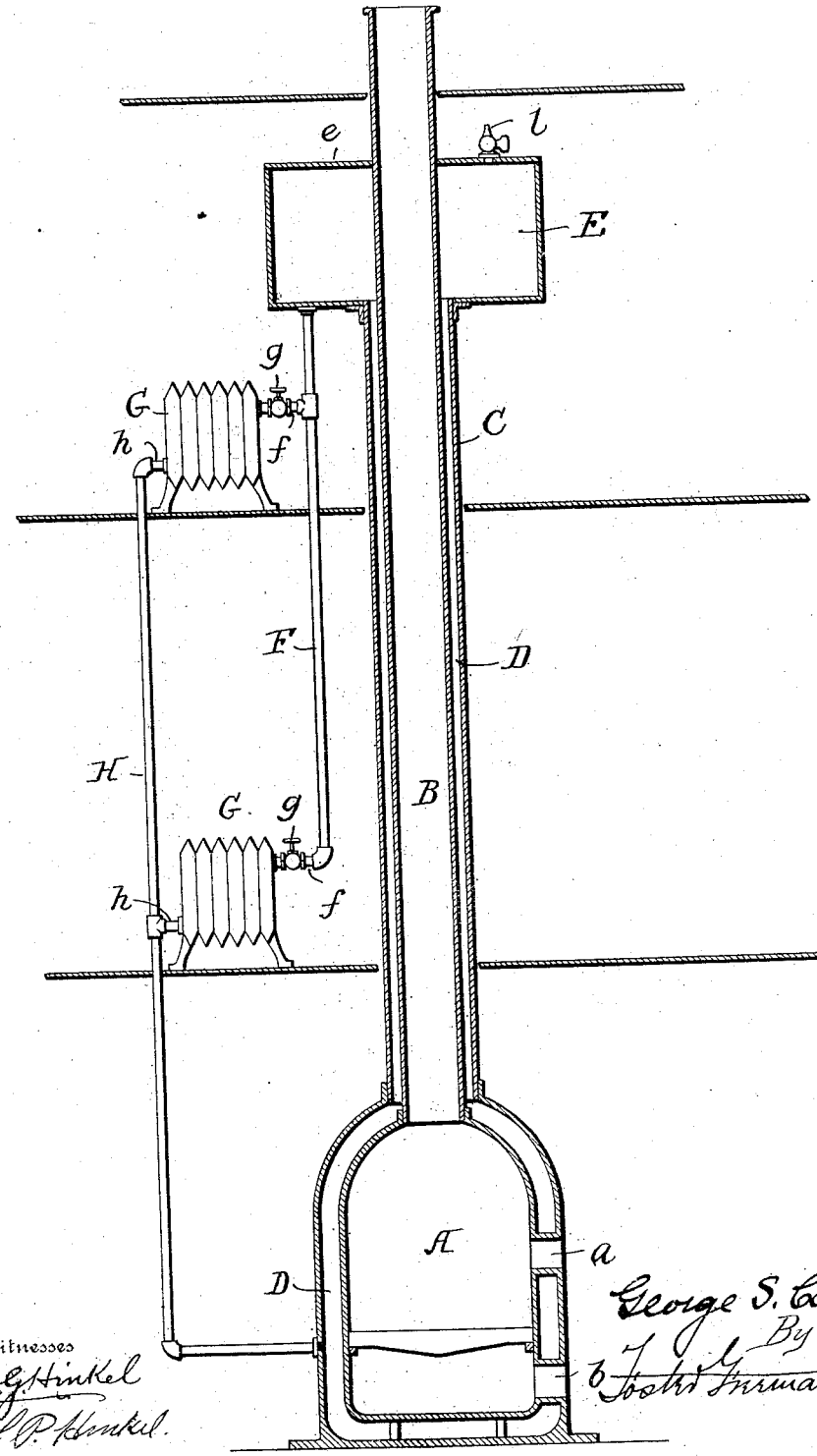

GEORGE S. COMSTOCK, OF MECHANICSBURG, PENNSYLVANIA.

HOT-WATER HEATING SYSTEM.

No. 866,842.

Specification of Letters Patent.

Patented Sept. 24, 1907.

Application filed June 1, 1903. Serial No. 159,667.

*To all whom it may concern:*

Be it known that I, GEORGE S. COMSTOCK, a citizen of the United States, residing at Mechanicsburg, in the county of Cumberland and State of Pennsylvania, have invented certain new and useful Improvements in Hot-Water Heating Systems, of which the following is a specification.

This invention relates to improvements in hot water heating systems, its object being to provide simple and efficient means for utilizing the heat of an ordinary furnace and its smoke flue for heating water and causing the heated water to ascend to an elevated expansion tank, from whence it will flow downwardly through radiators to be again heated.

The invention will be fully described hereinafter, reference being had to the accompanying drawing, which is a sectional elevation showing a heating system embodying my invention.

A is a fire box or furnace from the upper end of which a smoke stack or flue B extends upwardly out through the roof of the building. These may be of any suitable form and will preferably be made of metal. A casing C surrounds the furnace and flue to leave a space between them, such casing extending to a height above the highest point, where heat is to be distributed through a radiator. The space D between the casing C and the furnace and flue constitutes a continuous water chamber which communicates at its upper end with an expansion tank E supported at the upper end of the casing C and through which the smoke stack B extends.

From the expansion tank E a pipe F leads downwardly and from this pipe branch pipes *f* lead to radiators G. From the radiators the water flows through pipes *h* into a return pipe H which enters the water space D near its lower end. The pipes *f* are provided with valves *g* to control the flow of hot water to the radiators.

Such being the preferred construction the operation will be as follows: The water space D will be filled with water and the expansion tank nearly filled. If now a fire is burned in the furnace the heat radiated therefrom and from the smoke stack will heat the water and the hottest water will rise to the expansion tank whence it will flow down the pipe F through the radiators to the pipe H which returns it to the bottom of the water space.

It will be observed that each radiator is directly and independently connected to the hot water supply pipe leading from the expansion tank and consequently the water supplied to the several radiators will be of substantially the same temperature. All the radiators are also directly and independently connected to the return pipe and as soon as the water flows through the radiator it is carried by the return pipe to the lower part of the water casing to be again heated. The water is thus kept in constant circulation and the hottest water is always in the expansion chamber available for distribution through the radiators. Another advantage of my invention is that it affords perfect protection against any part of the building accidentally catching fire from the stove or the flue, as the continuous water jacket inclosing the furnace and the flue will effectually prevent the radiation of heat from either to a sufficient extent to set fire to adjacent wood work.

As shown in the drawing the water jacket incloses the ash pit as well as the furnace. Suitable openings, indicated by *a* and *b*, are provided in the furnace and ash pit, and these will be provided with doors as usual. The tank E is shown as provided with a cover *e* and a vent *t*.

Without limiting myself to the precise details of construction illustrated and described, I claim The combination with a furnace, its ash pit and smoke stack, the latter extending through the floor of a building, of a casing inclosing the furnace, ash pit, and smoke stack spaced a short distance therefrom, to form a continuous thin water jacket entirely surrounding the heating apparatus and smoke stack so as to form a heat insulating casing of water about said ash pit, furnace and smoke stack, except at the coal, ash and draft holes for the furnace and the upper end of the smoke stack, an expansion tank supported at the upper end of the casing and with which said water space communicates, a covering for said expansion tank through which the smoke stack passes and with which it is in engagement, a radiator below the said tank, a pipe leading from the tank to the radiator, and a pipe leading from the radiator to the lower portion of the water space, substantially as set forth.

In testimony whereof I have signed my name to this specification in the presence of two subscribing witnesses.

GEORGE S. COMSTOCK.

Witnesses:
SAML. A. LANDES,
ARNA L. GRUNDER.